(12) United States Patent
Jang et al.

(10) Patent No.: US 7,304,430 B2
(45) Date of Patent: Dec. 4, 2007

(54) FLUORESCENT FLAT LAMP ASSEMBLY PROVIDED WITH EXTERNAL ELECTRODES AND WITH INTERNAL ELECTRODES POSITIONED WITHIN SPACERS INSIDE THE FLAT LAMP

(75) Inventors: Sang-hun Jang, Gyeonggi-do (KR); Hidekazu Hatanaka, Gyeonggi-do (KR); Young-mo Kim, Gyeonggi-do (KR); Seong-eui Lee, Gyeonggi-do (KR); Xiaoqing Zeng, Gyeonggi-do (KR); Seung-hyun Son, Gyeonggi-do (KR); Gi-young Kim, Chungcheongbuk-do (KR); Hyoung-bin Park, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 565 days.

(21) Appl. No.: 10/963,721

(22) Filed: Oct. 14, 2004

(65) Prior Publication Data
US 2005/0082962 A1    Apr. 21, 2005

(30) Foreign Application Priority Data
Oct. 16, 2003   (KR) ...................... 10-2003-0072138

(51) Int. Cl.
*H01J 17/49* (2006.01)
*H01J 11/02* (2006.01)
*H01J 65/00* (2006.01)

(52) U.S. Cl. ...................... 313/581; 313/582; 313/234; 313/607; 313/292

(58) Field of Classification Search ................ 313/234, 313/607, 292, 634, 581–587
See application file for complete search history.

(56) References Cited

U.S. PATENT DOCUMENTS

| 5,329,203 A | * | 7/1994 | Jeong ........................ 313/491 |
| 2005/0280347 A1 | * | 12/2005 | Jang et al. .................. 313/492 |
| 2006/0061275 A1 | * | 3/2006 | Kim et al. ................... 313/581 |

FOREIGN PATENT DOCUMENTS

| JP | 63-232260 | 9/1988 |
| JP | 8-212974 | 8/1996 |
| JP | 2001-126669 | 5/2001 |
| JP | 2003-187752 | 7/2003 |
| KR | 2002057370 A | * 7/2002 |

OTHER PUBLICATIONS

Japanese Office Action dated Jun. 7, 2006.

* cited by examiner

*Primary Examiner*—Mariceli Santiago
(74) *Attorney, Agent, or Firm*—Buchanan Ingersoll & Rooney PC

(57) ABSTRACT

A flat lamp is provided, including an upper plate and a lower plate arranged to face each other at a predetermined distance; a plurality of spacers installed between the upper plate and the lower plate to form discharge spaces; a first and second electrodes provided in a stripe form on the outer surface of the upper plate or the lower plate with the respective discharge spaces located thereon; a first and second inner electrodes provided within each of the spacers; and a fluorescent layer formed on each of inner surfaces of the upper and lower plates and each of the outer surfaces of the spacers.

6 Claims, 7 Drawing Sheets

FLUORESCENT FLAT LAMP ASSEMBLY PROVIDED WITH EXTERNAL ELECTRODES AND WITH INTERNAL ELECTRODES POSITIONED WITHIN SPACERS INSIDE THE FLAT LAMP

BACKGROUND OF THE INVENTION

This application claims the priority of Korean Patent Application No. 2003-72138, filed on Oct. 16, 2003, in the Korean Intellectual Property Office, the disclosure of which is incorporated herein in its entirety by reference.

1. Field of the Invention

The present invention relates to a flat lamp, and more particularly, to a flat lamp having a high brightness, a high luminous efficiency, and a uniform distribution of brightness.

2. Description of the Related Art

Flat lamps mainly used as back-light of liquid crystal displays (LCDs) have been developed into surface discharge type or facing surfaces discharge type lamps, in which the entire space under a light emitting surface makes a discharge space considering the luminous efficiency and uniformity of brightness, from conventional edge-light or direct-light type lamps using a cold cathode fluorescent lamp.

In general, the surface discharge type is advantageous in that a discharge characteristics is stable compared to the facing surfaces discharge type. However, the overall brightness of the surface discharge type is lower than that of the facing surfaces discharge type. As an example of a conventional surface discharge flat lamp, there is a lamp in which the overall discharge space is divided into fine discharge areas to prevent local concentration of discharge. This lamp can discharge stably. However, since the uniformity of the overall brightness is inferior due to a difference in the brightness and a gap between the fine discharge areas, a diffusing paper or diffusing plate is needed to uniformly diffuse light.

FIG. 1 shows another example of a conventional surface discharge type flat lamp. Referring to FIG. 1, discharge spaces filled with discharge gas are formed between an upper plate 20 and a lower plate 10 separated at a predetermined distance by a plurality of spacers 14.

A fluorescent layer 30 is formed on each of the inner surfaces of the upper and lower plates 20 and 10 and at both sides of the spacers 14. Pairs of electrodes including a first and second upper electrodes 22a and 22b and a first and second lower electrodes 12a and 12b are provided, respectively, on the outer surfaces of the upper and lower plates 20 and 10, which correspond to the respective discharge spaces. The first upper electrode 22a and the first lower electrode 12a facing each other maintain the same electric potential so that discharge is not induced therebetween. Also, the second upper electrode 22b and the second lower electrode 12b facing each other maintain the same electric potential so that discharge is not induced therebetween. Meanwhile, a predetermined electric potential difference is present between the upper electrode pair 22a and 22b and the lower electrode pair 12a and 12b so that discharge is induced between the electrode pairs in a direction parallel to the upper plate 20 or the lower plate 10.

In the flat lamps having the above structure, it is disadvantageous that since the first and second upper electrodes 22a and 22b on the upper plate 20 and the spacers 14 interfere light generated by a discharge, it is difficult to obtain uniform light. Also, when partial pressure of the discharge gas is increased, the discharge voltage highly increases.

SUMMARY OF THE INVENTION

The present invention provides a flat lamp having a high brightness, a high luminous efficiency, and a uniform distribution of brightness by having electrodes within spacers.

According to an aspect of the present invention, there is provided a flat lamp including an upper plate and a lower plate arranged to face each other at a predetermined distance; a plurality of spacers installed between the upper plate and the lower plate to form discharge spaces; a first and second electrodes provided in a stripe form on the outer surface of the upper plate or the lower plate with the respective discharge spaces located thereon; a first and second inner electrodes provided within each of the spacers; and a fluorescent layer formed on each of inner surfaces of the upper and lower plates and each of outer surfaces of the spacers.

The spacers may be arranged in a direction parallel to the first and second electrodes and the first and second inner electrodes are provided along both lateral sides within the spacers.

The spacers may be in the form of a cylinder or circular pipe. When the spacers are in the form of a circular pipe, the fluorescent layer may also be formed on each of inner surfaces of the spacers.

The spacers may be formed of glass.

According to another aspect of the present invention, there is provided a flat lamp including an upper plate; a lower plate arranged to face the upper plate and having a plurality of flat portions separated by a predetermined distance from the upper plate and a plurality of protrusion portions projecting between the flat portions, of which top surfaces contact the inner surface of the upper plate to form discharge spaces; a first and second electrodes provided in a stripe form on the outer surface of the upper plate or the lower plate with the respective discharge spaces located thereon; a first and second inner electrodes provided within each of the protrusion portions; and a fluorescent layer formed on each of inner surfaces of the upper and lower plates.

The protrusion portions may be arranged in a direction parallel to the first and second electrodes, and the first and second inner electrodes may be provided along both lateral sides within the protrusion portions.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
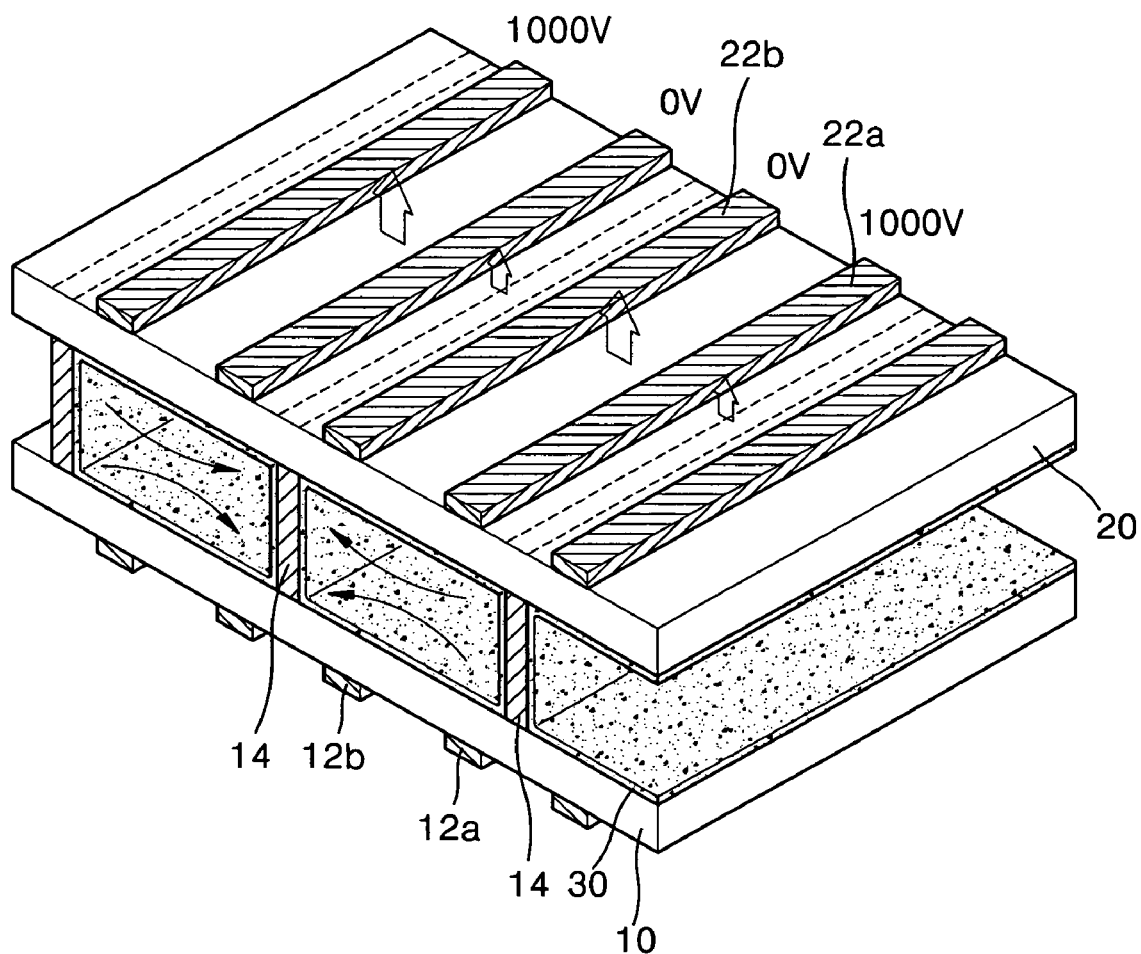
FIG. 1 is a perspective view schematically showing a conventional flat lamp.

The present invention will now be described more fully with reference to the accompanying drawings, in which embodiments of the invention are shown. In the drawings, like reference numbers refer to like elements throughout.

Figure 2:
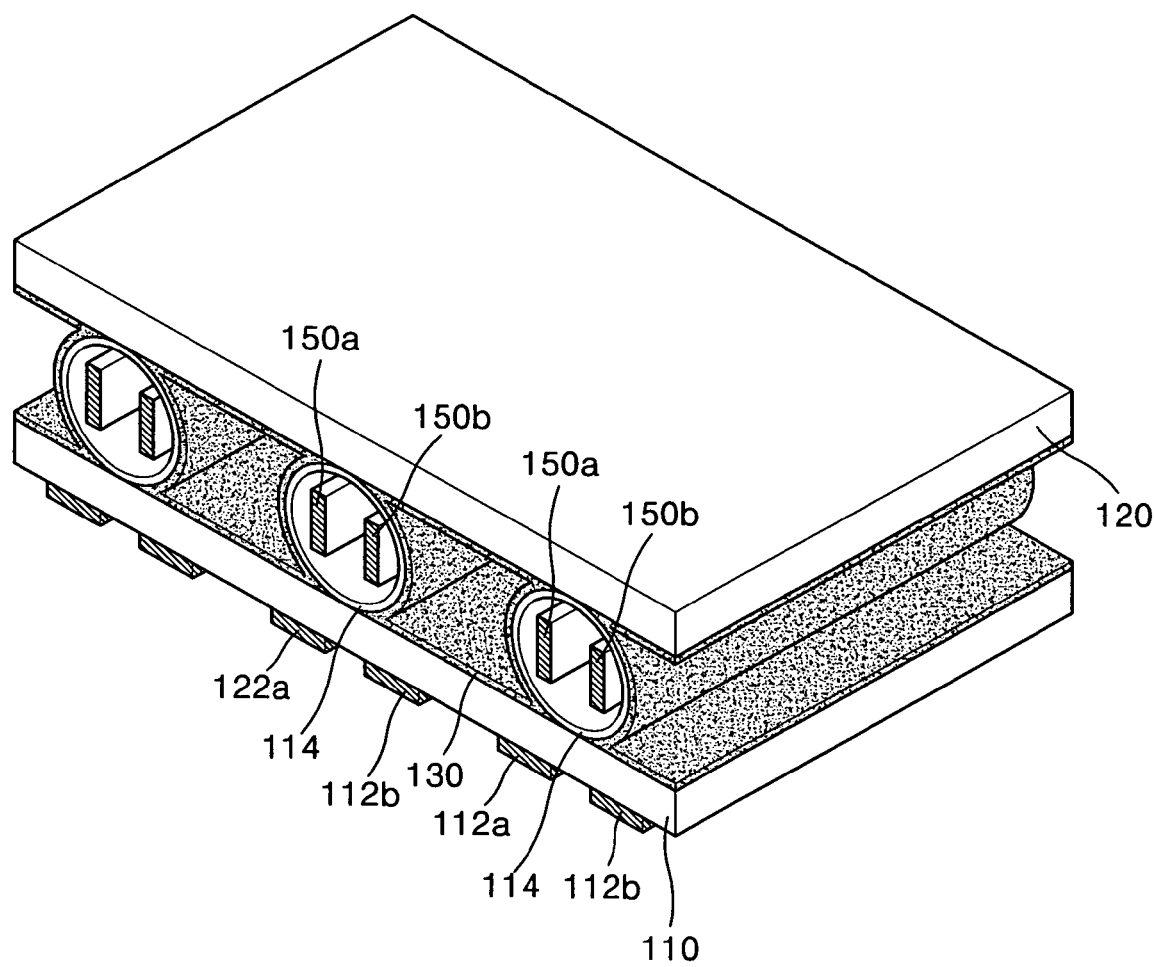
FIG. 2 is a perspective view schematically showing a flat lamp according to an embodiment of the present invention.
Figure 3:
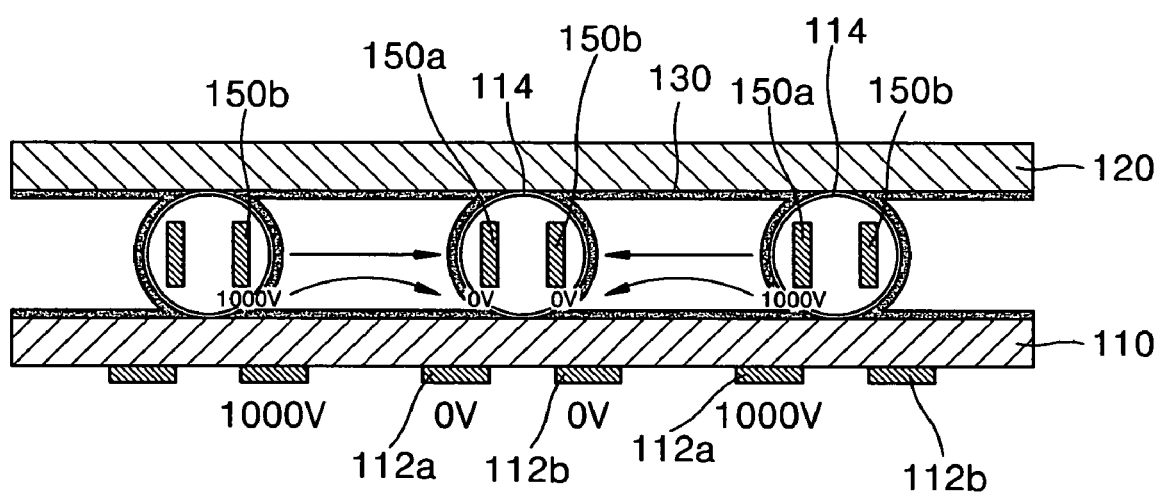
FIG. 3 is a cross-sectional view of the flat lamp of FIG. 2.

FIGS. 2 and 3 are a perspective view and a vertical cross-sectional view of a flat lamp according to the present invention, respectively.

Referring to FIGS. 2 and 3, an upper plate 120 and a lower plate 110 are arranged to face each other at a predetermined distance. The upper plate 120 and the lower plate 110 may be formed of glass. A plurality of spacers 114 are provided between the upper plate 120 and the lower plate 110, so that the upper plate 120 and the lower plate 110 are separated by a predetermined distance. The spacers 114 are separated by a predetermined distance in parallel to each other, and are in the form of a circular pipe. The spacers 114 are formed of glass. Meanwhile, the spacers 114 may be in the form of a cylinder. By the spacers 114, a plurality of discharge spaces are formed between the upper plate 120 and the lower plate 110. The discharge spaces are filled with discharge gas to generate ultraviolet rays during discharge.

A first and second electrodes 112a and 112b are provided on the outer surface of the lower plate 110 with the respective discharge spaces located thereon, in a direction parallel to the spacers 114 and in a stripe form. Alternatively, the first and second electrodes 112a and 112b may be provided on the outer surface of the upper plate 120.

A first and second inner electrodes 150a and 150b are provided within the spacers 114. The first and second inner electrodes 150a and 150b are provided along both lateral sides within the spacer 114. The first and second inner electrodes 150a and 150b are formed of a conductive material.

A fluorescent layer 130 is formed on each of the inner surfaces of the upper and lower plates 120 and 110 and each of outer surfaces of the spacers 114. Alternatively, the fluorescent layer 130 may also be formed on the inner surface of the spacer 114 in the form of a circular pipe. A reflection layer may be interposed between the fluorescent layer 130 and the lower plate 110, so that entire light generated in the discharge spaces proceeds toward the upper plate 120.

In the flat lamp having the above structure, when voltage is applied to the first and second electrodes 112a and 112b and the first and second inner electrodes 150a and 150b, respectively, as shown in FIG. 3, discharge is induced within the discharge spaces. Here, the discharge is induced by an electric field which is formed by the first and second electrodes 112a and 112b on the outer surface of the lower plate 110 and an electric field which is formed by the first and second inner electrodes 150a and 150b within each of the adjacent spacers 114. The first and second inner electrodes 150a and 150b provided within of the spacer 114 are arranged to face to those of an adjacent spacer 114, thereby inducing a facing type electric field. Thus, the discharge is actively induced even at low voltage.

Meanwhile, the upper plate having the inner surface contacting the spacers 114 in the form of a circular pipe has a reduced contact area. Thus, light proceeds toward the upper plate 120 without interference of spacers 114, resulting in an improved uniformity of light. In addition, the area of the outer surface of the spacer 114 coated with the fluorescent layer 130 is increased, resulting in more light.

Figure 4A:
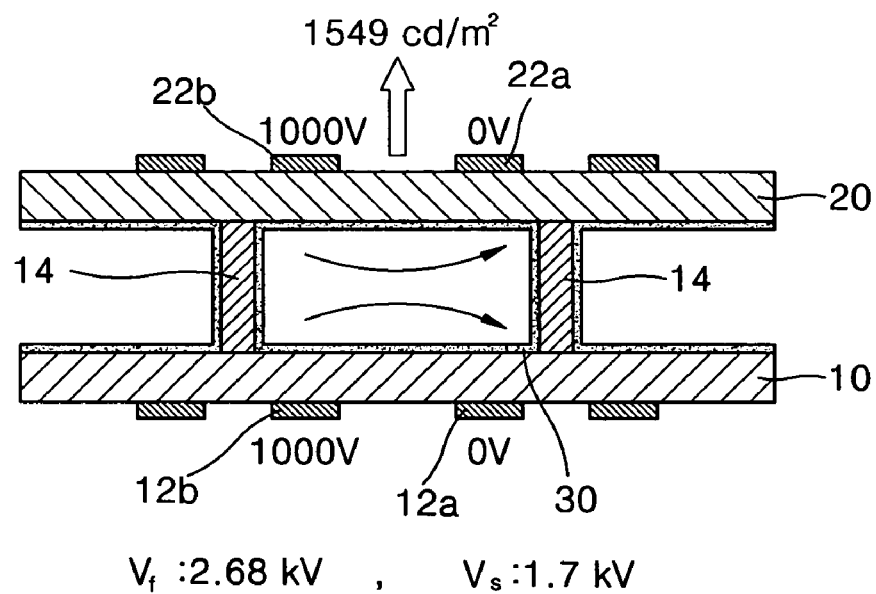
FIGS. 4A and 4B are diagrams showing discharge voltage and intensity of light during discharge of the conventional flat lamp and those of the flat lamp according to the present invention, respectively.
Figure 4B:
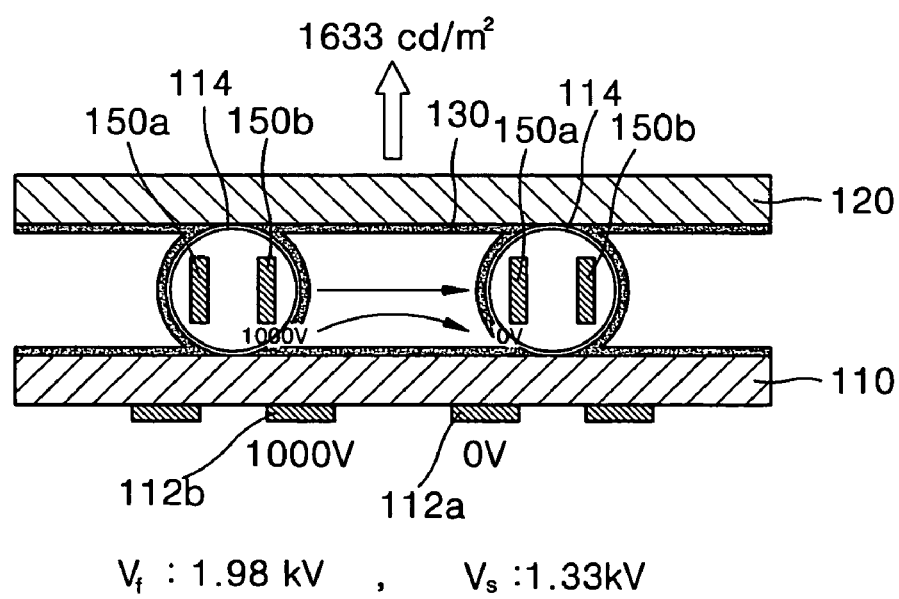

FIGS. 4A and 4B show the discharge voltage and the intensity of light during discharge of the conventional flat lamp compared to the flat lamp according to an embodiment of the present invention. FIGS. 4A and 4B show the test results measured using the discharge space filled with 10% Ne—Xe discharge gas at the discharge gas pressure of 260 mbar.

First, referring to FIG. 4A, the conventional flat lamp has a discharge starting voltage $V_f$ and a discharge maintenance voltage $V_s$ of 2.68 kV and 1.7 kV, respectively. When entire light generated through discharge by applying the voltage of 2 kV proceeds toward the upper plate 20, the intensity of light is 1549 cd/m². Next, referring to FIG. 4B, the flat lamp according to the present invention has the discharge starting voltage $V_f$ and the discharge maintenance voltage $V_s$ of 1.98 kV and 1.33 kV, respectively. When entire light generated through discharge by applying of the voltage of 2 kV proceeds toward the upper plate 120, the intensity of light is 1633 cd/m².

Comparing such results, the discharge starting voltage and the discharge maintenance voltage of the flat lamp according to the present invention are lower than those of the conventional flat lamp. The intensity of light proceeding toward the upper plate 120 of the flat lamp according to the present invention is higher than that of the conventional flat lamp. Thus, when using the flat lamp of the present invention, the luminous efficiency and brightness can be improved.

Figure 5A:
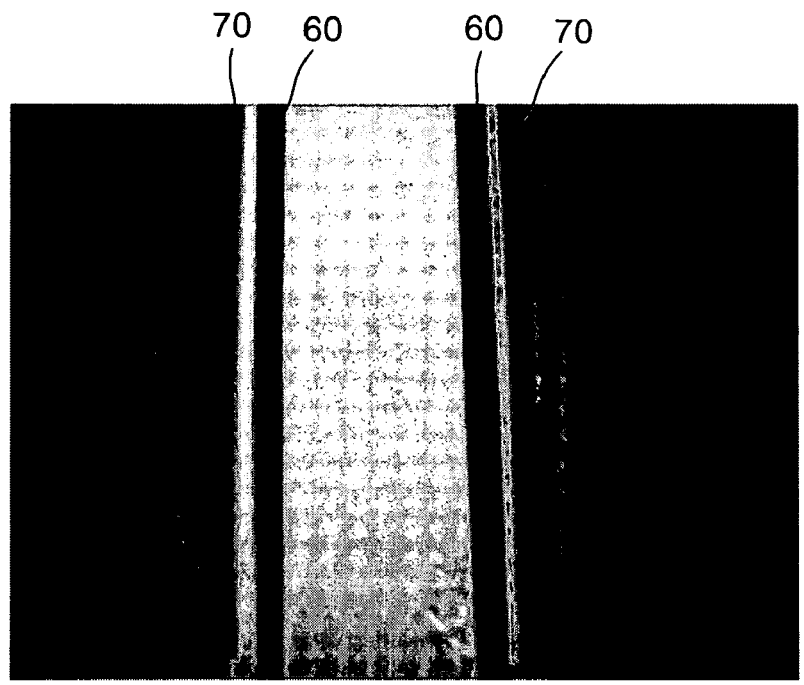
FIGS. 5A and 5B are photographs of upper plates during discharge of the conventional flat lamp and the flat lamp according to the present invention, respectively.
Figure 5B:
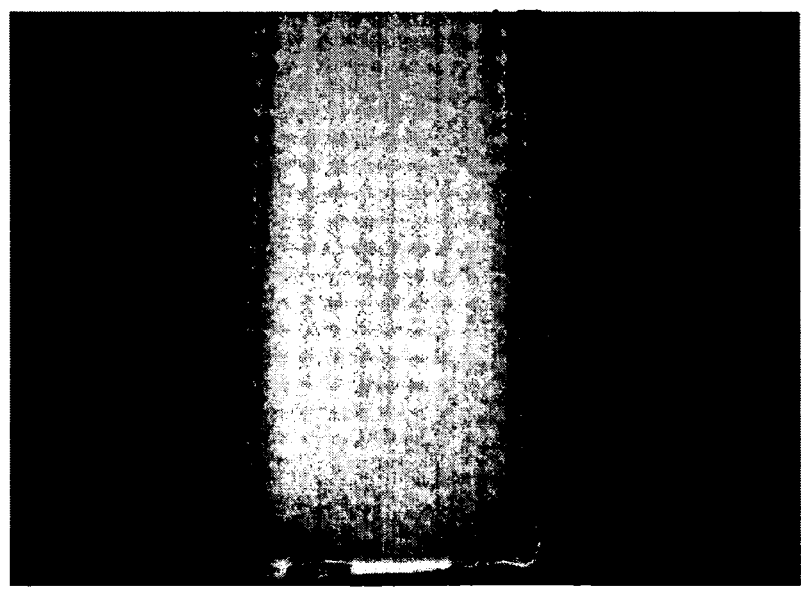

FIGS. 5A and 5B are photographs of the upper plates during discharge of the conventional flat lamp and the flat lamp according to an embodiment of the present invention.

In the conventional flat lamp, since light emitted toward the upper plate (20 in FIG. 4A) is interrupted by the spacer 14, the first and second upper electrodes 22a and 22b, a spacer pattern 70 and an electrode pattern 60, as shown in FIG. 5A, are formed. On the contrary, since the flat lamp of the present invention has the first and second inner electrodes 150a and 150b provided within the spacers (114 in FIG. 4B) in the form of a circular pipe, neither the spacer pattern (70 in FIG. 5A) nor the electrode pattern (60 in FIG. 5A) are shown. Accordingly, when using the flat lamp of the present invention, the uniformity of light can be improved.

Figure 6A:
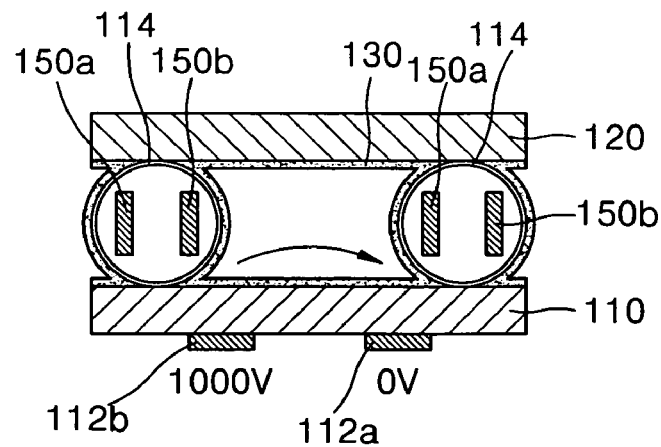
FIGS. 6A through 6C are diagrams showing the flat lamp according to the present invention when voltage is applied only to a first and second electrodes, when voltage is applied only to a first and second inner electrodes, and when voltage is applied to both the first and second electrodes and the first and second inner electrodes, respectively.
Figure 6B:
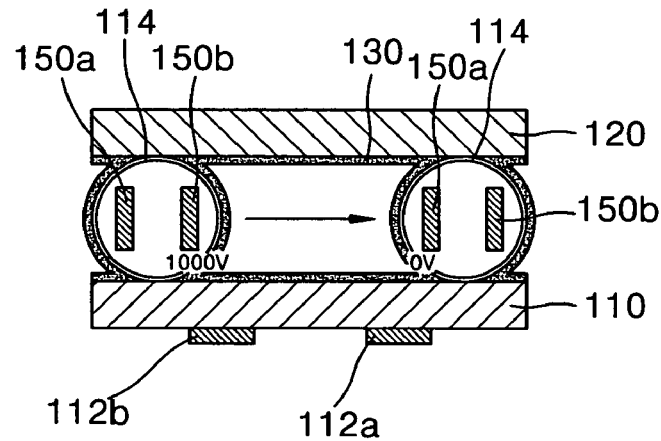
Figure 6C:
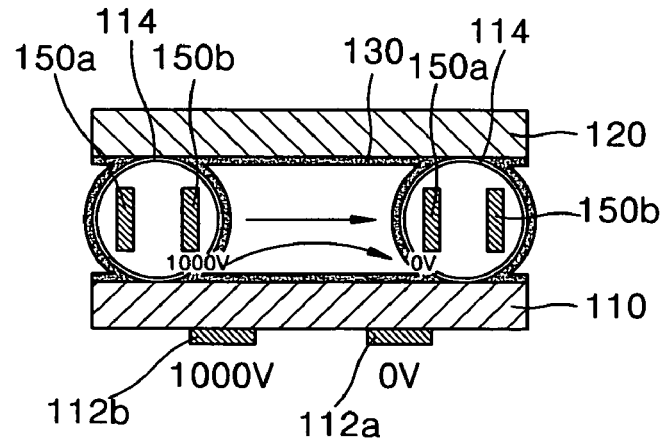

FIGS. 6A through 6C show the flat lamps according to an embodiment of the present invention in the cases of applying the voltage only to the first and second electrodes 112a and 112b, only to the first and second inner electrodes 150a and 150b, and to both the first and second electrodes 112a and 112b and the first and second inner electrodes 150a and 150b. When applying the voltage as described above, the discharge starting voltage is highest in the case of applying the voltage only to the first and second electrodes 112a and 112b, as shown in FIG. 6A, and is lowest in the case of applying the voltage to both the first and second electrodes 112a and 112b and the first and second inner electrodes 150a and 150b, as shown in FIG. 6C.

Figure 7:
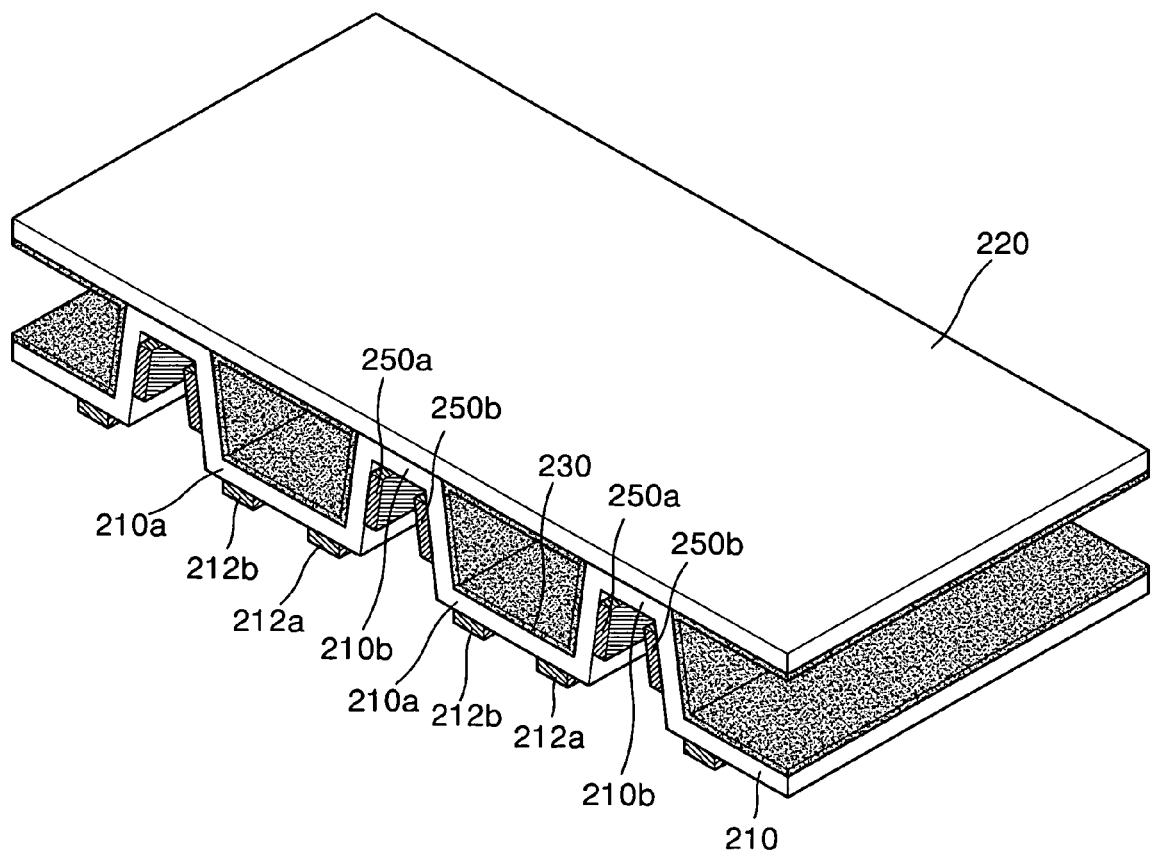
FIG. 7 is a perspective view schematically showing a flat lamp according to another embodiment of the present invention.

FIG. 7 is a perspective view of the flat lamp according to another embodiment of the present invention.

Referring to FIG. 7, the flat lamp has an upper plate 220 and a lower plate 210 arranged to face to each other. The upper plate 220 and the lower plate 210 may be formed of glass. The lower plate 210 has a plurality of flat portions 210a separated by a predetermined distance from the upper plate 220 and a plurality of protrusion portions 210b projecting between the flat portions 210a. The protrusion portions 210b function as the spacers in the flat lamp according to an embodiment of the present invention. That is, the top surfaces of the protrusion portions 210b contact the inner surface of the upper plate 220, such that the flat portions 210a are separated by a predetermined distance from the upper plate 220. The protrusion portions 210b spacing at a predetermined distance are arranged in a direction parallel to each other. Such protrusion portions 210b form a plurality of discharge spaces between the upper plate 220 and the lower plate 210. The discharge spaces are filled with discharge gas to generate ultraviolet rays during discharge.

A first and second electrodes 212a and 212b are provided on the outer surface of the flat portions 210a of the lower plate 210 with the respective discharge spaces located thereon, in a direction parallel to the protrusion portions 210b and in a stripe form. Alternatively, the first and second electrodes 212a and 212b may be provided on the outer surface of the upper plate 220 with the respective discharge spaces located thereon.

The protrusion portions 210b have a first and second inner electrodes 250a and 250b provided therein. The first and second inner electrodes 250a and 250b are arranged along both lateral sides within the protrusion portion 210b.

A fluorescent layer is formed on each of the inner surfaces of the upper plate 220 and the lower plate 210. Meanwhile, a reflection layer (not shown) is interposed between the fluorescent layer 230 and the lower plate 210, so that entire light generated at the discharge space during discharge proceeds toward the upper plate 220.

In the flat lamp having the above structure, when applying the voltage to each of the first and second electrodes 212a and 212b and the first and second inner electrodes 250a and 250b, discharge is generated within the discharge space. Here, the discharge is generated by an electric field which is formed by the first and second electrodes 212a and 212b on the flat portion 210a of the lower plate 210 and an electric field which is formed by the first and second inner electrodes 250a, 250b within the adjacent protrusion portions 210b. The first and second inner electrodes 250a and 250b provided in the inner lateral side of the protrusion portion 210b face to those of an adjacent protrusion 210b, so that a facing type electric field is induced. Thus, discharge can actively be induced even at low voltage.

As described above, a flat lamp according to the present invention has the following effects.

First, the electrodes are provided within the spacers to induce a facing type electric field, thereby actively inducing discharge even at low voltage.

Second, the spacers in the form of a cylinder or circular pipe are provided between the upper plate and the lower plate, so that light proceeds toward the upper plate without interference of the spacers, thereby improving the uniformity of light.

Third, the area coated with a fluorescent material is increased to generate more light, thereby improving brightness.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A flat lamp comprising:
   an upper plate and a lower plate arranged to face each other at a predetermined distance;
   a plurality of spacers installed between the upper plate and the lower plate to form discharge spaces;
   first and second electrodes provided in a stripe form on an outer surface of the upper plate or the lower plate with the respective discharge spaces located thereon;
   first and second inner electrodes provided within each of the spacers; and
   a fluorescent layer formed on each of inner surfaces of the upper and lower plates and each of outer surfaces of the spacers.

2. The flat lamp of claim 1, wherein the spacers are arranged in a direction parallel to the first and second electrodes.

3. The flat lamp of claim 1, wherein the first and second inner electrodes are provided along both lateral sides of the spacers.

4. The flat lamp of claim 1, wherein the spacers are in the form of a cylinder or circular pipe.

5. The flat lamp of claim 4, wherein if the spacers are in the form of a circular pipe, the fluorescent layer is also formed on each of inner surfaces of the spacers.

6. The flat lamp of claim 1, wherein the spacers are formed of glass.

* * * * *